United States Patent
Han

(10) Patent No.: US 7,450,564 B2
(45) Date of Patent: Nov. 11, 2008

(54) HEAD END APPARATUS FOR MEDIA GATEWAY CONTROL PROTOCOL TYPE VOICE OVER INTERNET PROTOCOL CALL SERVICE

(75) Inventor: Dong-Sik Han, Songnam-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1298 days.

(21) Appl. No.: 10/434,275

(22) Filed: May 9, 2003

(65) Prior Publication Data

US 2003/0219011 A1 Nov. 27, 2003

(30) Foreign Application Priority Data

May 24, 2002 (KR) ............................ 2002-28915

(51) Int. Cl.
*H04L 12/66* (2006.01)

(52) U.S. Cl. ................. 370/352; 370/389; 370/401; 370/465

(58) Field of Classification Search ................. 370/352, 370/354, 389, 400, 401, 465, 466, 467
See application file for complete search history.

(56) References Cited

U.S. PATENT DOCUMENTS

| | | | |
|---|---|---|---|
| 6,069,890 A * | 5/2000 | White et al. ................. 370/352 |
| 6,446,127 B1 | 9/2002 | Schuster et al. | |
| 6,449,251 B1 | 9/2002 | Awadallah et al. | |
| 6,490,451 B1 * | 12/2002 | Denman et al. ............. 455/436 |
| 6,683,877 B1 * | 1/2004 | Gibbs et al. ............. 370/395.2 |
| 7,031,267 B2 * | 4/2006 | Krumel ....................... 370/255 |
| 7,039,048 B1 * | 5/2006 | Monta et al. ................. 370/389 |
| 7,046,683 B1 * | 5/2006 | Zhao ........................... 370/352 |
| 7,106,725 B2 * | 9/2006 | Andaker et al. ............. 370/352 |
| 7,274,684 B2 * | 9/2007 | Young et al. ................. 370/352 |
| 2002/0015387 A1 * | 2/2002 | Houh .......................... 370/250 |
| 2002/0085552 A1 | 7/2002 | Tandon | |
| 2002/0162116 A1 | 10/2002 | Read et al. | |
| 2002/0176403 A1 | 11/2002 | Radian | |

* cited by examiner

*Primary Examiner*—Harry S Hong
(74) *Attorney, Agent, or Firm*—Robert E. Bushnell, Esq.

(57) ABSTRACT

A head end apparatus is used in a VoIP (voice over Internet protocol) network providing a VoIP service to subscribers by using an MGCP (media gateway control protocol, the VoIP network employing data communication terminals together with VoIP terminals. The head end apparatus allows the VoIP network to provide data communication service as well as VoIP service to the subscribers by minimizing lack of authorized IP (Internet protocol) addresses. The head end apparatus having an MGCP network address translator (NAT) router establishes a second path for VoIP communication between a VoIP terminal and an IP (Internet protocol) network which is separated from a first path for data communication established between a data communication terminal and the IP network by a contemporary router.

18 Claims, 7 Drawing Sheets

HEAD END APPARATUS FOR MEDIA GATEWAY CONTROL PROTOCOL TYPE VOICE OVER INTERNET PROTOCOL CALL SERVICE

CLAIM OF PRIORITY

This application makes reference to, incorporates the same herein, and claims all benefits accruing under 35 U.S.C. §119 from an application for HEAD-END DEVICE FOR VOICE OVER INTERNET PROTOCOL CALL SERVICE OF MEDIA GATEWAY CONTROL PROTOCOL earlier filed in the Korean Industrial Property Office on May 24, 2002 and there duly assigned Ser. No. 2002-28915.

BACKGROUND OF THE INVENTION

1. Field of the Invention

The present invention relates to a voice over Internet protocol (hereinafter, referred to VoIP) service, and more particularly to a head end apparatus for a media gateway control protocol (hereinafter, referred to MGCP) type call service.

2. Description of the Related Art

As very high speed Internet service has become widely provided, use of VoIP service has rapidly spread through the Internet. For a protocol to provide the VoIP service, H.323, MGCP, and SIP (session initiation protocol) are used. In a cable network, the MGCP type is selected as a packet-cable specification and is scheduled for service.

Presently-used Internet service modes for subscribers are mainly divided into an ADSL (asymmetric digital subscriber line) mode, a cable MODEM mode and a private LAN (local area Network) mode. The ADSL mode is widely used in homes in Korea, the cable MODEM mode is widely used in homes in the Americas and Europe, and the private LAN mode is widely used in companies. Although a PPP (point-to-point protocol) mode using PSTN (public switched telephone network)/ISDN (integrated services digital network) was widely used in the past, the use of the PPP mode has gradually been reduced.

An ISP (Internet service provider) providing the Internet service through the ADSL and the cable MODEM uses a DHCP (dynamic host configuration protocol) mode in order to provide very high speed data communication service to many subscribers while using a limited number of authorized IP (Internet Protocol) addresses. According to the DHCP mode, the authorized IP address is assigned to the subscriber only when the subscriber uses a computer in order to efficiently distribute the limited authorized IP addresses. When the ISP installs a backbone router using a NAT (network address translator) function, data transmission speed will be lowered and network games are not executable due to packet loss and delay, so the ISP assigns the authorized IP address to the subscriber by using the DHCP without using the NAT function.

Recently, many Internet users want to have the data communication service together with the VoIP service. The VoIP is a main technique for Internet telephony, because it supports the providing of data together with voice through the Internet by using the IP.

If the ISP operates the VoIP network using the DHCP mode for providing the data communication service, in which the authorized IP address is assigned to the subscriber without using the NAT function, the IP address is continuously assigned to the VoIP terminal as long as the VoIP terminal is connected to the network, so that the ISP lacks the authorized IP addresses.

SUMMARY OF THE INVENTION

It is therefore an object of the present invention to provide a head end apparatus, which is used in a VoIP network providing a VoIP service to many subscribers who use a data communication terminal together with a VoIP terminal, capable of providing data communication service as well as VoIP service while reducing the lack of authorized IP addresses.

It is another object to provide a technique of efficiently providing data communication services and VoIP service to subscribers while minimizing the lack of authorized IP addresses.

In order to accomplish the above and other objects, there is provided a head end apparatus including: a DHCP (dynamic host configuration protocol) server for assigning the authorized IP (Internet Protocol) address to the data communication terminals and a private IP address to the VoIP terminals; a router for routing an IP packet transmitted between the data communication terminals and the Internet and for blocking the IP packet when the IP packet includes a UDP (user datagram protocol) packet having a destination address identical to an IP address of the call agent or the gateway; and an MGCP NAT (network address translator) router for transmitting the IP packet to the Internet by changing a source IP address of the IP packet to the authorized IP address while assigning a new UDP port number when the IP packet having the UDP packet with the source IP address identical to the private IP address and the destination IP address identical to the IP address of the call agent or the gateway is received from the VoIP terminal, for registering the IP addresses and the UDP port numbers to a translation table, and for transmitting the IP packet by changing the destination IP address and UDP port number of the IP packet to a registered private IP address and a registered UDP port number when it receives from the Internet the IP packet having the source IP address identical to the IP address of the call agent or the gateway and having the UDP port number registered in the translation table.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
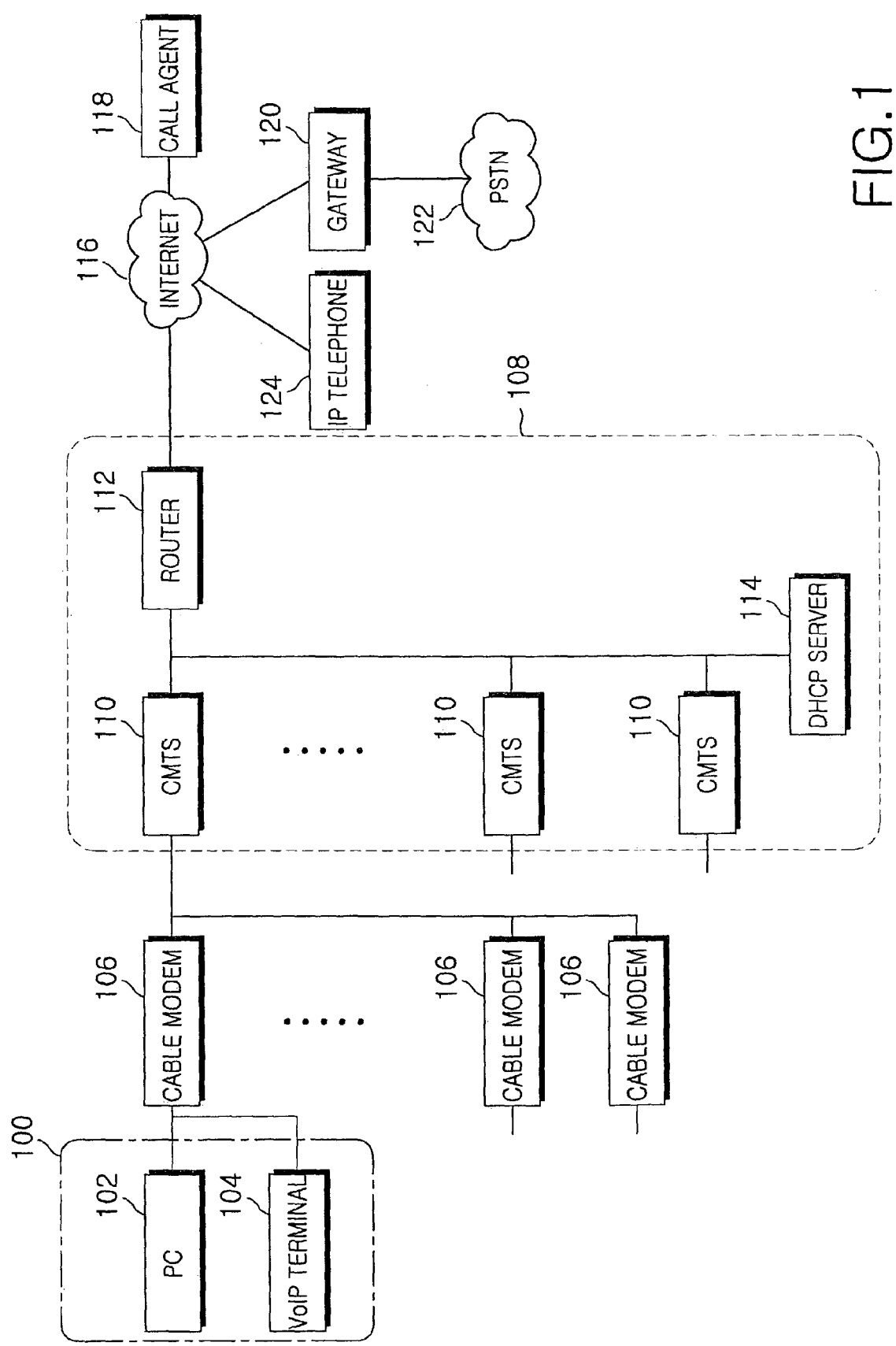
FIG. 1 is a view showing a VoIP network using a conventional cable network.

FIG. 1 is a view showing a VoIP network using a cable network for providing the data communication service together with the VoIP service using the DHCP mode to subscribers who use a data communication terminal as well as a VoIP terminal. A PC (personal computer) 102 and a VoIP terminal 104, which are data communication terminals of a subscriber 100, are connected to, cable modems 106 connected to a head end apparatus 108 of the ISP. The VoIP terminal 104 is a telephone for receiving the VoIP service and connected to one of the cable modems 106 together with the PC 102. Although only one VoIP terminal 104 is shown in FIG. 1, a plurality of VoIP terminals 104 can be connected to one cable modem. In addition, though it is not illustrated, the PC and the VoIP terminals are connected to each cable modem 106. The head end apparatus 108 is connected to the cable modems 106 and an Internet 116, and includes a plurality of CMTS (cable modem termination system) 110, a router 112 and a DHCP server 114. The cable modems 106 are connected to each CMTS 110 connected to the router 112 and the DHCP server 114. When the subscriber 100 wants to use the data communication service or the VoIP service, an authorized IP address is assigned to the PC 102 or the VoIP terminal 104 from the DHCP server 114 through the CMTS 110 and the cable modem 106 corresponding to the PC 102 or the VoIP terminal 104. Then, the PC 102 or the VoIP terminal 104 is connected to the Internet 116 through the router 112. The router 112 is provided for routing an IP packet transmitted between the PC 102 and the Internet 116, and between the VoIP terminal 104 and the Internet 116. In addition, a call agent 118 which is a server for providing the VoIP service and a gateway 120 are connected to the Internet 116 with the authorized IP address and an IP telephone 124 is also connected to the Internet 116. The call agent 118 controls the gateway 120 according to incoming calls and outgoing calls with respect to the VoIP terminal 104. Based on the control of the call agent 118, the gateway 120 allows the VoIP terminal 104 to receive the VoIP service by interworking a general telephone network, such as a PSTN 122 with an IP network, such as the Internet 116.

In the VoIP network providing the data communication service by using the DHCP mode, in which the authorized IP address is assigned to the subscriber without using the NAT function, which causes the packet loss and delay, when the VoIP terminal 104 is connected to the network, the VoIP terminal 104 registers its terminal information to the call agent and is operated for the incoming calls and outgoing calls by receiving the IP address from the DHCP server 114. After the VoIP terminal 104 has been connected to the network, if the IP address release time lapses, the VoIP terminal 104 again requests the IP address to the DHCP server 114 for the call connection so that the IP address is assigned to the VoIP terminal 104. Accordingly, the IP address is assigned to the VoIP terminal 104 as long as the VoIP terminal 104 is connected to the network, so the ISP lacks the authorized IP addresses.

As mentioned above, if the ISP operates the VoIP network using the DHCP mode for providing the data communication service, in which the authorized IP address is assigned to the subscriber without using the NAT function, the IP address is continuously assigned to the VoIP terminal as long as the VoIP terminal is connected to the network, so that the ISP lacks the authorized IP addresses.

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

Figure 2:
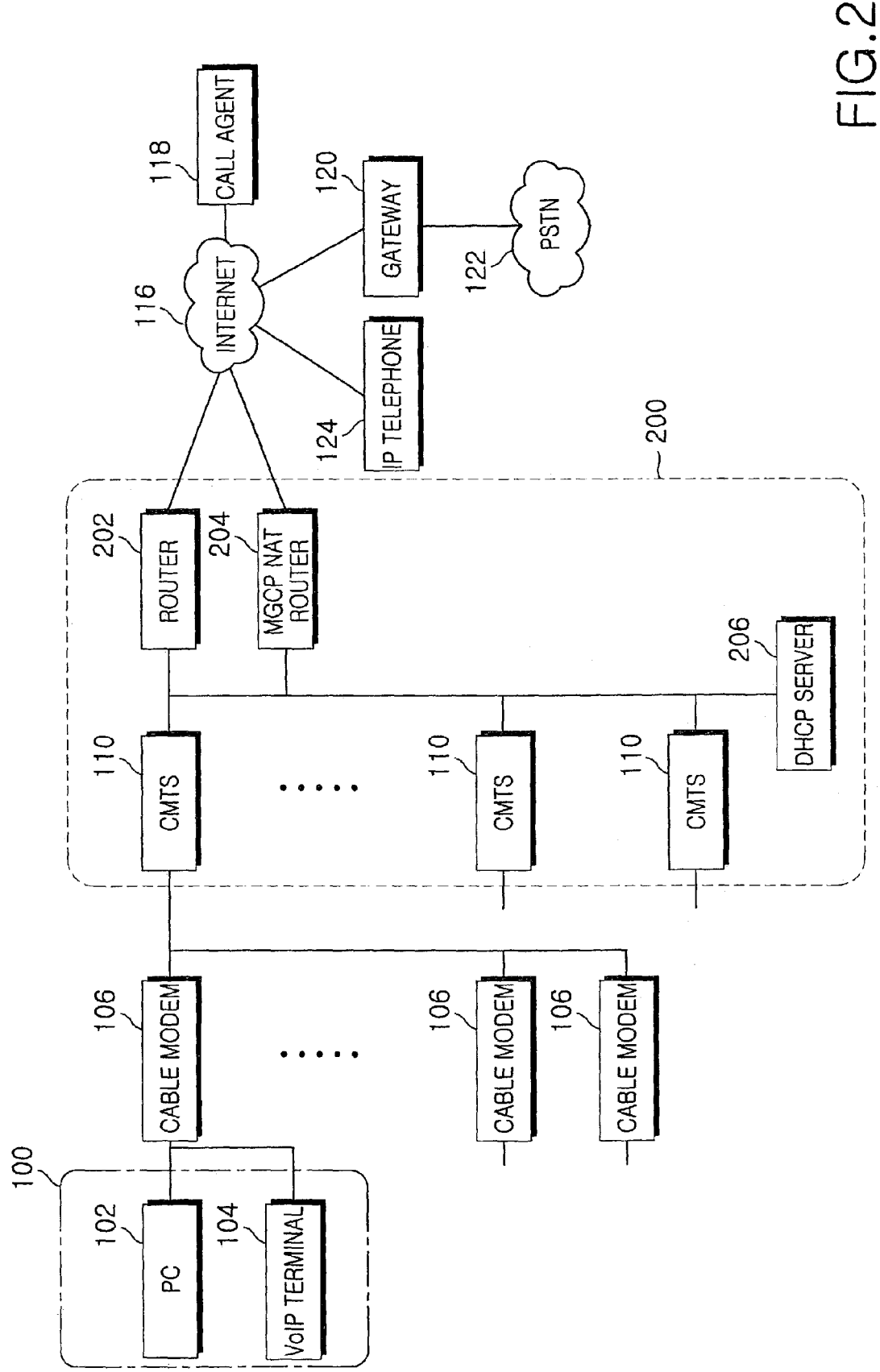
FIG. 2 is a view showing a VoIP network using a cable network having a head end apparatus according to one embodiment of the present invention.

FIG. 2 is a view showing a VoIP network using a cable network having a head end apparatus according to one embodiment of the present invention. When the VoIP network is provided by using an MGCP, an MGCP NAT router 204 is added to the head end apparatus 108 shown in FIG. 1, and a router 202 and a DHCP 206 are installed such that they may be operated according to the present invention as follows. Since the MGCP carries out a call setup and a voice communication by using a UDP (user datagram protocol), the port number used in the MGCP is managed in the MGCP NAT router 204, so that another packet communication path separated from, a packet communication path of the router 202 used for providing conventional data communication service is formed. Remaining elements are identical to the elements shown in FIG. 1 and the same reference numerals are used to refer the same elements. The head end apparatus 200 includes the MGCP NAT router 204 that is connected to the router 202, DHCP server 206, and multiple CMTSs 110 as seen in FIG. 2.

When the subscriber 100 registers terminal information to the call agent 118 after installing the MGCP VoIP terminal 104, the DHCP server 206 assigns a private IP address, instead of an authorized IP address, to the VoIP terminal 104. In addition, information in/from (in and from) the MGCP VoIP terminal is also stored in the MGCP NAT router 204. When the subscriber 100 requests the data communication service by using the PC 102, the DHCP server 206 assigns the authorized IP address to the PC 102. Thus, the PC 102 receives the Internet service by using the authorized IP address. If the VoIP communication is required, the VoIP terminal 104 requests the call setup to the call agent 118 in the Internet 116 by using the private IP address, so that the VoIP communication is carried out. At this time, the router 202 has a destination address identical to the IP address of the call agent 118 or the gateway 120 and blocks the IP packet having the UDP packet.

Figure 3:
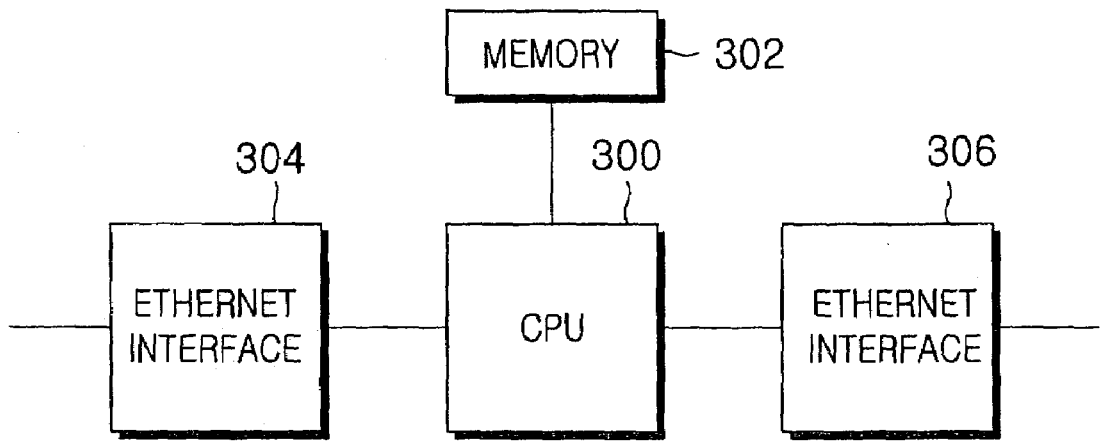
FIG. 3 is a block view showing hardware of an MGCP NAT router according to one embodiment of the present invention.
Figure 4:
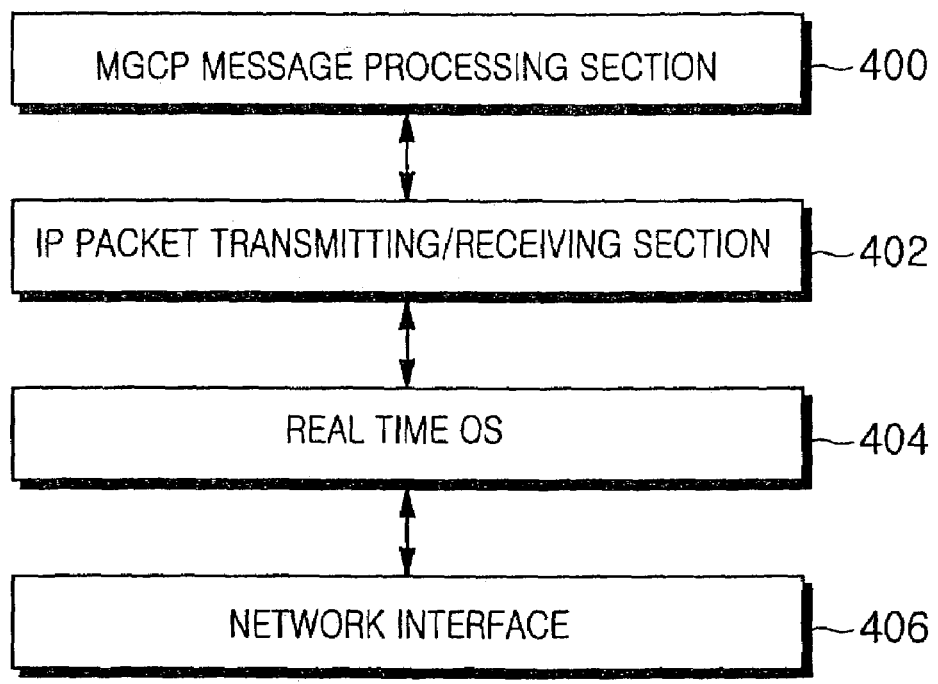
FIG. 4 is a block view showing software of an MGCP NAT router according to one embodiment of the present invention.
Figure 5:
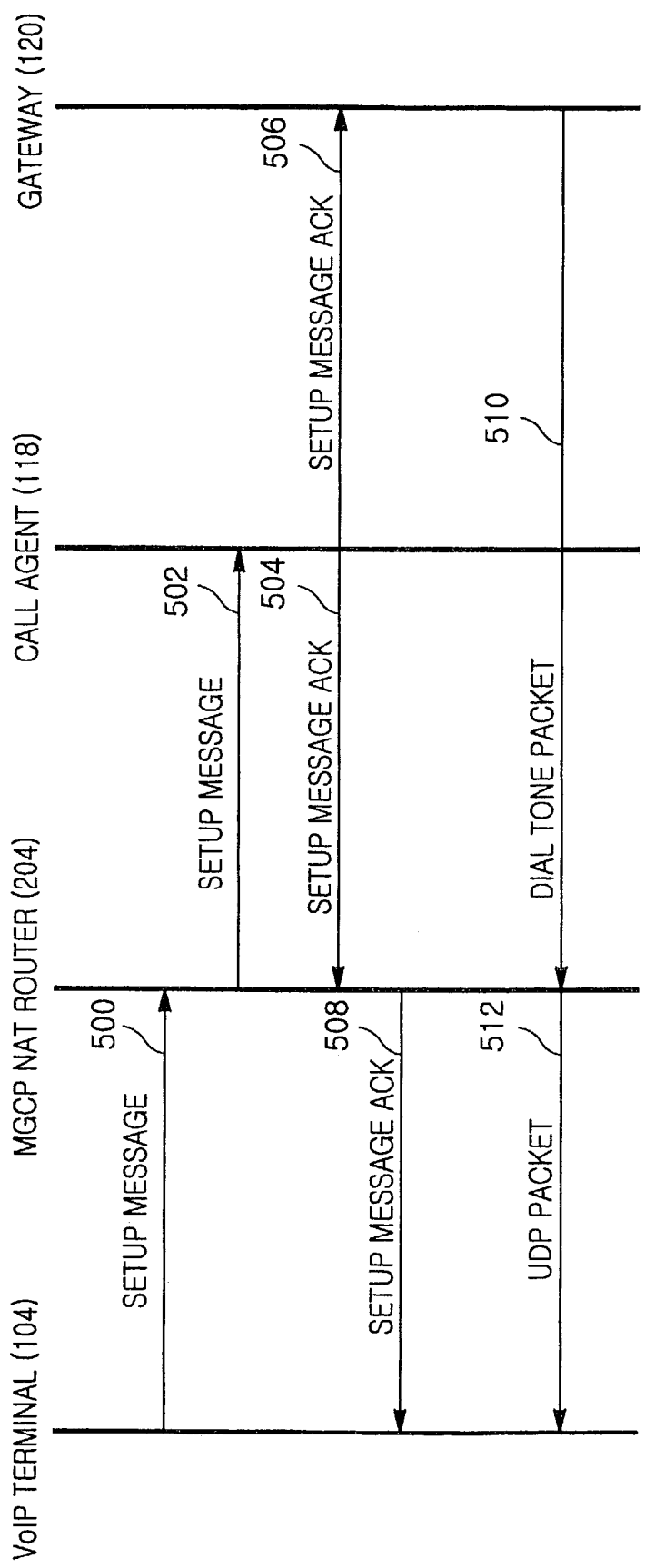
FIG. 5 is a view showing a VoIP call setup procedure according to one embodiment of the present invention.
Figure 6:
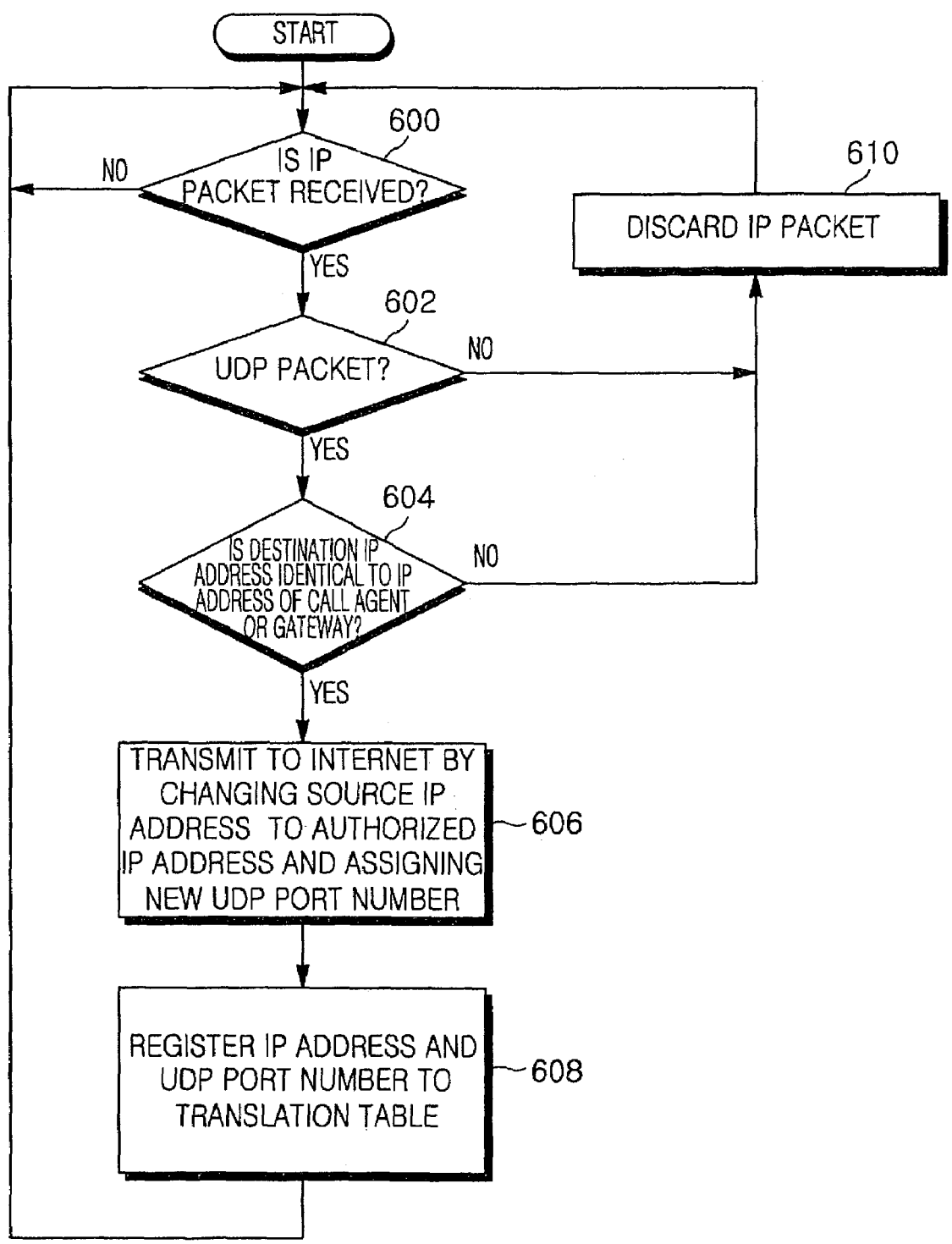
FIGS. 6 and 7 are flow charts showing a processing flow of an MGCP NAT router according to one embodiment of the present invention.

As shown in FIG. 3, the MGCP NAT router 204 includes a CPU (central processing unit) 300, a memory 302, a first Ethernet interface 304 for the connection to the CMTS 110 and a second Ethernet interface 308 for the connection to the Internet 116. The CPU or controller 300 accommodates a controlling of the MGCP NAT router 204. The memory 302 is connected to the CPU 300 and stores information used by the CPU 300. The first Ethernet interface 304 accommodates the MGCP NAT router 204 to connect to the cable modems 106 through the CMTS 110, where the cable modem 106 accommodates a connection with the VoIP Terminal 104 and the PC 102. Since the MGCP NAT router 204 is usable if a basic platform of a network product is provided, an NT (network termination) server or a UNIX server is used for the MGCP NAT router 204 or software having a structure shown in FIG. 4 and flow charts shown in FIGS. 5 and 6 is used as a stand-alone type product for the MGCP NAT router 204. In addition, as shown in FIG. 4, software carried out by the CPU 300 of the MGCP NAT router 204 has a structure including an MGCP message processing section 400, an IP packet transmitting/receiving (transmitting and receiving) section 402, a real time OS (operating system) 400, and a network interface section 406. The MGCP message processing section 400 accommodates message processing using media gateway control protocol. The IP packet transmitting/receiving section 402 is in communication link with the MGCP message processing section 400, where the IP packet transmitting/receiving section 402 accommodates a transmitting and receiving of Internet protocol packets. The real time OS 400 provides a real time operating system for the MGCP message processing section 400 and the IP packet transmitting/receiving section 402. The network interface section 406 provides a network interface for the MGCP NAT router 204 with the real time OS 400.

On the assumption that a private IP address assigned to the VoIP terminal 104 from the DHCP server 206 is "100.10.10.20", an authorized IP address of the MGCP NAT router 204 is "210.222.10.100", a UDP port number used by the VoIP terminal 104 is "2427", a UDP port number used by the VoIP terminal 104 in RTP (real-time transfer protocol) is "3456", and a UDP port number used by the VoIP terminal 104 in RTCP (real-time transfer control protocol) is "3457", the VoIP call setup procedure including steps 500 to 512 according to the present invention will be described with reference to FIG. 5. When the VoIP terminal 104 transmits a setup message by using the IP address of "100.10.10.20" and the UDP port number of "2427" (step 500), the MGCP NAT router 204 changes the IP address to the authorized IP address of "210.222.10.100", and transmits the setup message to the call agent 118 while assigning a new UDP port number, for example "4000" (step 502). Then, the call agent 118 sends an ACK (acknowledge) to the MGCP NAT router 204 and the gateway 120 with the IP address of "210.222.10.100" and the UDP port number of "4000" (steps 504 and 506). Next, the MGCP NAT router 204 sends a setup message ACK to the VoIP terminal 104 by changing the IP address to "100.10.10.20", which is the private IP address of the VoIP terminal 104, and the UDP port number to "2427" (step 508). In addition, the gateway 120 sends a dial tone packet to the MGCP NAT router 204 with the IP address of "210.222.10.100" and the UDP port number of "4000" while hooking-off the PSTN 122 (step 510). Then, the MGCP NAT router 204 sends the UDP packet to the VoIP terminal 104 by changing the IP address to "100.10.10.20", which is the private IP address of the VoIP terminal 104, and the UDP port number to "3456" (step 512). Thus, the subscriber can hear a dial tone and try a dialing so as to receive the VoIP service.

In order to change the IP address and the port number, the MGCP NAT router 204 has a translation table in the memory 302. For example, if the subscriber 100 has three VoIP terminals 104 and the private IP addresses thereof are "100.10.10.20", "100.10.10.21" and "100.10.10.22", the translation table is represented as following table 1.

FIG. 6. When the MGCP NAT router 204 receives the IP packet (step 600), it is checked whether or not the IP packet includes the UDP packet (step 602). If the IP packet has no UDP packet, the IP packet is not adapted for the VoIP service using the MGCP, so the IP packet is discarded (step 610) and the processing flow returns to step 600. However, if the IP packet includes the UDP packet, it is checked whether or not the destination address of the IP packet is identical to the IP address of the call agent 118 or the gateway 120 (step 604). If the destination address does not match with the IP address of the call agent 118 or the gateway 120, step 610 is carried out. However, if the destination address matches with the IP address of the call agent 118 or the gateway 120, which means that the IP packet is to be sent to the call agent 118 or the gateway 120 from the VoIP terminal 104, step 606 is carried out. In step 606, the source IP address of the IP packet is changed to the authorized IP address, that is "210.222.10.100" as shown in table 1, and a new UDP port number is assigned and transmitted to the Internet 116. At this time, as shown in table 1, "4000" is assigned as the UDP port number when the IP packet is sent to the call agent 118. However, when the IP packet is sent to the gateway 120, a new UDP port number is assigned instead of "4000". That is, "4001" is assigned with respect to the RTP and "4002" is assigned with respect to the RTCP. Then, the IP addresses and the UDP port numbers are registered and stored in the translation table as shown in table 1 (step 608), and the processing flow is returned to step 600. At this time, as shown in table 1, if the UDP port number is "2427" because the source IP address is "100.10.10.20", which is the private IP address, and is sent to the call agent 118, the private IP address of "100.10.10.20", the UDP port number of "2427" and the newly assigned UDP port number of "4000" are registered in the translation table. In addition, if the UDP port number is "3456" with respect to the RTP and "3457" with respect to the RTCP because the source IP address is "100.10.10.20", which is the private IP address, and is sent to the gateway 120, the private IP address of "100.10.10.20", the UDP port numbers of "3456" and "3457", and the newly assigned UDP port numbers of "4001" and "4002" are registered in the translation table.

Since the router 202 blocks the IP packet including the UDP packet and having the destination address identical to the IP address of the call agent 118 or the gateway 120, the IP packet including the UDP packet is prevented from being transmitted through the router 202.

Hereinafter, a processing flow including steps 700 to 710 of the CPU 300 of the MGCP NAT router 204 according to the present invention, when the IP packet sent to the VoIP termi-

TABLE 1

| | private IP | VoIP terminal to call agent | VoIP terminal to gateway | call agent to VoIP terminal | gateway to VoIP terminal | authorized IP address |
|---|---|---|---|---|---|---|
| 1 | 100.10.10.20 | 2427 | RTP;3456 RTCP;3457 | 4000 | RTP;4001 RTCP;4002 | 210.222.10.100 |
| 2 | 100.10.10.21 | 2427 | RTP;3456 RTCP;3457 | 4003 | RTP;4004 RTCP;4005 | 210.222.10.100 |
| 3 | 100.10.10.22 | 2427 | RTP;3456 RTCP;3457 | 4006 | RTP;4007 RTCP;4008 | 210.222.10.100 |
| . | | | | | | |
| . | | | | | | |
| . | | | | | | |

Figure 7:
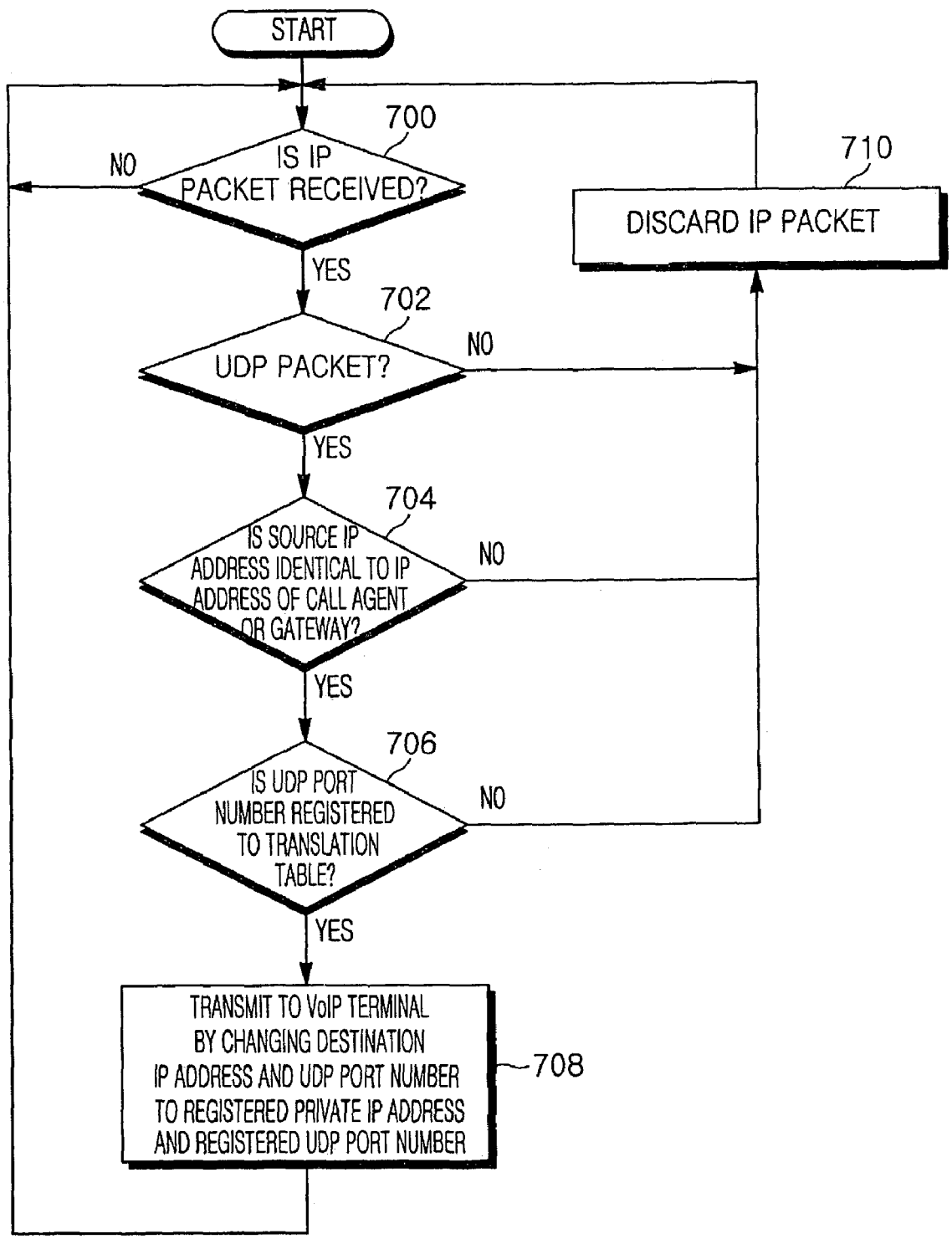

Hereinafter, the processing flow including steps 600 to 610 of the CPU 300 of the MGCP NAT router 204 according to one embodiment of the present invention, when the IP packet sent to the call agent 118 or to the gateway 120 from the VoIP terminal 104 is received, will be described with reference to nal 104 from the call agent 118 or the gateway 120 is received in a state that the IP address and the UDP port number has been registered in the translation table as the IP packet is sent to the call agent 118 or the gateway 120 from the VoIP terminal, will be described with reference to FIG. 7. When the MGCP NAT router 204 receives the IP packet (step 700), it is checked whether or not the IP packet includes the UDP packet (step 702). If the IP packet has no UDP packet, the IP packet is not adapted for the VoIP service using the MGCP, so the IP packet is discarded (step 710) and the processing flow returns to step 700. However, if the IP packet includes the UDP packet, it is checked whether or not the source address of the IP packet is identical to the IP address of the call agent 118 or the gateway 120 (step 704). If the source address does not match with the IP address of the call agent 118 or the gateway 120, step 710 is carried out. However, if the source address is matched with the IP address of the call agent 118 or the gateway 120, which means that the IP packet is sent to the VoIP terminal 104 from the call agent 118 or the gateway 120, step 706 is carried out. In step 706, it is checked whether or not the IP packet and the UDP port number have been registered in the translation table as shown in table 1. If the IP packet and the UDP port number are not registered in the translation table, step 710 is carried out. However, if the IP packet and the UDP port number has been registered in the translation table, the destination IP address and the UDP port number are changed to the private IP address and an original UDP port number registered in the translation table and sent to the VoIP terminal 104 (step 708). Then, the processing flow returns to step 700. At this time, for example, the destination IP address is changed to "100.10.10.20" as shown in table 1. In addition, the UDP port number is changed to "2427" if it is sent from the call agent 118, and is changed to "3456" with respect to the RTP and to "3457" with respect to RTCP if it is sent from the gateway 120.

Accordingly, in order to use the data communication service by using the PC 102 of the subscriber 100, the authorized IP address is provided while routing the IP packet by using the router 202. On the contrary, in order to use the VoIP service, the private IP address is assigned while routing the IP packet through the MGCP NAT router 204 by using the authorized IP address. Accordingly, the ISP can efficiently provide the data communication service and the VoIP service to the subscriber 100 while minimizing lack of authorized IP addresses.

The present invention can be realized as computer-executable instructions stored in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

Figure 8:
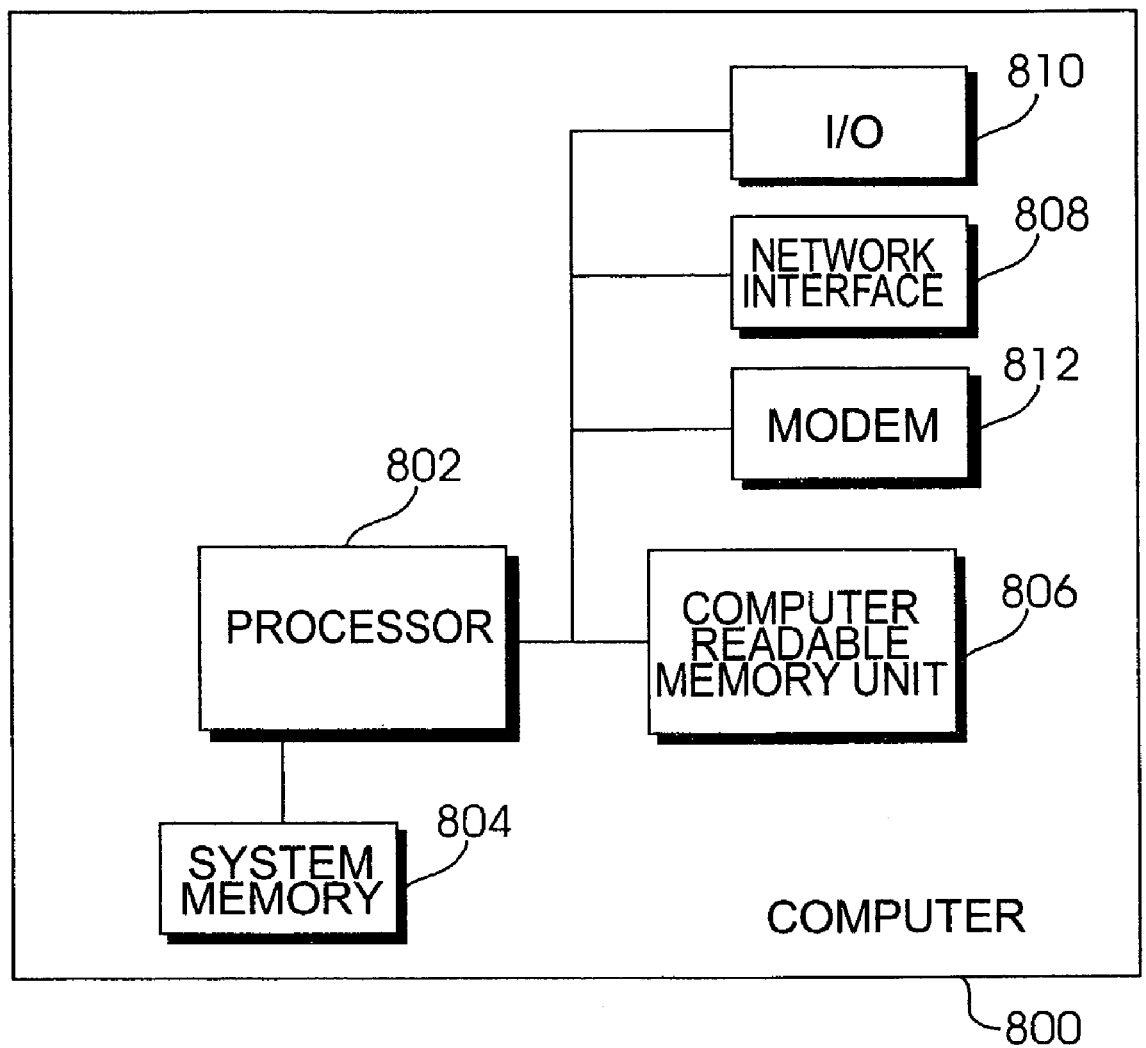
FIG. 8 is an example of a computer that can read computer readable media.

An example of a computer, but not limited to this example of the computer, that can read computer readable media that includes computer-executable instructions of the present invention is shown in FIG. 8. The computer 800 includes a processor 802 that controls the computer 800. The processor 800 uses the system memory 804 and a computer readable memory device 806 that includes certain computer readable recording media. A system bus connects the processor 802 to a network interface 808, modem 812 or other interface that accommodates a connection to another computer or network such as the Internet. The system bus may also include an input and output interface 810 that accommodates connection to a variety of other devices.

While the invention has been shown and described with reference to certain preferred embodiments thereof, it will be understood by those skilled in the art that various changes in form and details may be made therein without departing from the spirit and scope of the invention as defined by the appended claims. For example, although the present invention is described with reference to a VoIP network using a cable network, the present invention, if an MGCP VoIP is used, is applicable to subscribers of an ADSL and subscribers of a LAN private line.

What is claimed is:

1. A head end apparatus used in a voice over Internet protocol network providing a voice over Internet protocol service to subscribers using data communication terminals together with voice over Internet protocol terminals, by using a media gateway control protocol and including a call agent and a gateway connected to an Internet with an authorized Internet protocol address for providing voice over Internet protocol service to the voice over Internet protocol terminals, the head end apparatus comprising:

a dynamic host configuration protocol server assigning the authorized Internet protocol address to the data communication terminals and a private Internet protocol address to the voice over Internet protocol terminals;

a router accommodating a routing of an Internet protocol packet transmitted between the data communication terminals and the Internet and blocking the Internet protocol packet when the Internet protocol packet includes a user datagram protocol packet with having a destination address identical to an Internet protocol address of the call agent or the gateway; and a media gateway control protocol network address translator router transmitting the Internet protocol packet to the Internet by changing a source Internet protocol address of the Internet protocol packet to the authorized Internet protocol address while assigning a new user datagram protocol port number when the Internet protocol packet having the user datagram protocol packet with the source Internet protocol address identical to the private Internet protocol address and the destination Internet protocol address identical to the Internet protocol address of the call agent or the gateway is received from the voice over Internet protocol terminal, for registering the Internet protocol addresses and the user datagram protocol port numbers to a translation table, and for transmitting the Internet protocol packet by changing the destination Internet protocol address and user datagram protocol port number of the Internet protocol packet to a registered private Internet protocol address and a registered user datagram protocol port number when it receives from the Internet the Internet protocol packet having the source Internet protocol address identical to the Internet protocol address of the call agent or the gateway and the user datagram protocol port number registered in the translation table.

2. The head end apparatus of claim 1, with the subscribers including any one of a cable network, an asymmetric digital subscriber line network, and a local area network private line.

3. The head end apparatus of claim 1, said media gateway control protocol network address translator router further comprising:
   a controller accommodating a controlling of said a media gateway control protocol network address translator router;
   a memory connected to said controller and storing information used by said controller;
   a first network interface connecting said controller to a modem accommodating a connection with said voice over Internet protocol terminals and said data communication terminals; and
   a second network interface connecting said controller to the Internet.

4. The head end apparatus of claim 3, with said controller with said memory further comprising:
   a first section accommodating message processing using media gateway control protocol;
   a second section in communication link with said first section, said second section accommodating a transmitting and receiving of Internet protocol packets;
   a third section providing a real time operating system for said first and second sections; and
   a fourth section providing a network interface for said third section.

5. The head end apparatus of claim 1, with said media gateway control protocol network address translator router further comprising:
   a controller accommodating a controlling of said a media gateway control protocol network address translator router; and
   a memory connected to said controller and storing information used by said controller,
   with said controller with said memory further comprising:
      a first section accommodating message processing using media gateway control protocol;
      a second section in communication link with said first section, said second section accommodating a transmitting and receiving of Internet protocol packets;
      a third section providing a real time operating system for said first and second sections; and
      a fourth section providing a network interface for said third section.

6. The head end apparatus of claim 2, said media gateway control protocol network address translator router further comprising:
   a controller accommodating a controlling of said a media gateway control protocol network address translator router;
   a memory connected to said controller and storing information used by said controller;
   a first network interface connecting said controller to a modem accommodating a connection with said voice over Internet protocol terminals and said data communication terminals; and
   a second network interface connecting said controller to the Internet.

7. The head end apparatus of claim 6, with said controller with said memory further comprising:
   a first section accommodating message processing using media gateway control protocol;
   a second section in communication link with said first section, said second section accommodating a transmitting and receiving of Internet protocol packets;
   a third section providing a real time operating system for said first and second sections; and
   a fourth section providing a network interface for said third section.

8. A method, comprising:
   changing an original private Internet protocol address to an authorized Internet protocol address by a first router including a media gateway control protocol network address translator, when a voice over Internet protocol terminal transmits a setup message by using the original private Internet protocol address and a user datagram protocol port number, the authorized Internet protocol address providing voice over Internet protocol service to voice over Internet protocol terminals;
   transmitting the setup message by said first router to said call agent while assigning a new user datagram protocol port number from an original user datagram protocol port number;
   sending a dial tone packet by a gateway to said first router with the authorized Internet protocol address and new datagram protocol port number while hooking-off of a public switched telephone network; and
   sending a user datagram packet by said first router to said voice over Internet protocol terminal by changing the authorized Internet protocol address back to the private Internet protocol address and the new user datagram protocol port back to the original datagram protocol port accommodating the subscriber to use a voice over Internet protocol service.

9. The method of claim 8, further comprising of sending an acknowledgment by said call agent to said first router and said gateway with the authorized Internet protocol address and new user datagram protocol port number.

10. The method of claim 9, further comprising of sending a setup message acknowledgment by said first router to said voice over Internet protocol terminal by changing the Internet protocol address and user datagram protocol port number.

11. The method of claim 8, further comprising of sending a setup message acknowledgment by said first router to said voice over Internet protocol terminal by changing the Internet protocol address and user datagram protocol port number.

12. A method, comprising:
   checking whether an Internet protocol packet includes a user datagram protocol packet by a first router having a media gateway control protocol network address translator;
   checking whether a destination address of the Internet protocol packet corresponds to an Internet protocol address of a call agent or a gateway;
   changing a source Internet protocol address of the Internet protocol packet to an authorized Internet protocol address and new user datagram protocol numbers are assigned when the destination address of the Internet protocol packet corresponds to an Internet protocol address of a call agent or a gateway, the authorized Internet protocol address providing voice over Internet protocol service to voice over Internet protocol terminals;

transmitting the authorized Internet protocol address and the new user datagram protocol numbers to the Internet; and registering the Internet protocol addresses and port numbers into a translation table.

13. The method of claim 12, further comprising of discarding the Internet protocol packet when the Internet protocol packet has no user datagram protocol packet, the Internet protocol packet is not adapted for voice over Internet protocol service using media gateway control protocol.

14. The method of claim 13, further comprising of sending the Internet protocol packet to said call agent or said gateway from said voice over Internet protocol terminal when the destination address of the Internet protocol packet corresponds to the Internet protocol address of said call agent or said gateway, respectively.

15. The method of claim 14, further comprising of discarding the Internet protocol packet when the destination address of the Internet protocol packet does not correspond to the Internet protocol address of said call agent or said gateway.

16. The method of claim 15, further comprising:

checking by said first router whether a source address of the Internet protocol packet corresponds to an Internet protocol address of said call agent or said gateway;

checking whether the Internet protocol packet and the new user datagram protocol port number have been registered in the translation table when the source address of the Internet protocol packet corresponds to the Internet protocol address of said call agent or said gateway;

changing the destination Internet protocol address of the Internet protocol packet to the original private Internet protocol address and the new user datagram protocol numbers to the original user datagram protocol numbers registered in the translation table when the Internet protocol packet and the user datagram protocol port number has been registered in the translation table.

17. A computer-readable medium storing computer-executable instructions for performing a method, the method comprising:

changing an original private Internet protocol address to an authorized Internet protocol address by a first router including a media gateway control protocol network address translator, when a voice over Internet protocol terminal transmits a setup message by using the original private Internet protocol address and a user datagram protocol port number, the authorized Internet protocol address providing voice over Internet protocol service to voice over Internet protocol terminals;

transmitting the setup message by said first router to said call agent while assigning a new user datagram protocol port number from an original user datagram protocol port number;

sending a dial tone packet by a gateway to said first router with the authorized Internet protocol address and new datagram protocol port number while hooking-off of a public switched telephone network; and sending a user datagram packet by said first router to said voice over Internet protocol terminal by changing the authorized Internet protocol address back to the private Internet protocol is address and the new user datagram protocol port back to the original datagram protocol port accommodating the subscriber to use a voice over Internet protocol service.

18. A computer-readable medium storing computer-executable information, the computer-readable medium comprising:

a first field of the information containing data representing a checking of whether an Internet protocol packet includes a user datagram protocol packet by a first router having a media gateway control protocol network address translator;

a second field of the information containing data representing a checking of whether a destination address of the Internet protocol packet corresponds to an Internet protocol address of a call agent or a gateway;

a third field of the information containing data representing a changing of a source Internet protocol address of the Internet protocol packet to an authorized Internet protocol address and new user datagram protocol numbers are assigned when the destination address of the Internet protocol packet corresponds to an Internet protocol address of a call agent or a gateway, the authorized Internet protocol address providing voice over Internet protocol service to voice over Internet protocol terminals;

a fourth field of the information containing data representing transmitting the authorized Internet protocol address and the new user datagram protocol numbers to the Internet; and a fifth field of the information containing data representing registering the Internet protocol addresses and port numbers into a translation table.

* * * * *